United States Patent [19]

Shimizu et al.

[11] Patent Number: 5,115,051
[45] Date of Patent: May 19, 1992

[54] METHOD OF PREVENTING POLYMER SCALE DEPOSITION IN A POLYMERIZATION VESSEL

[75] Inventors: Toshihide Shimizu, Urayasu; Ichiro Kaneko, Hazaki; Mikio Watanabe, Kamisu, all of Japan

[73] Assignee: Shin-Etsu Chemical Co., Ltd., Tokyo, Japan

[21] Appl. No.: 447,856

[22] Filed: Dec. 8, 1989

[30] Foreign Application Priority Data

Dec. 9, 1988 [JP] Japan .................. 63-311603
Dec. 9, 1988 [JP] Japan .................. 63-311604

[51] Int. Cl.$^5$ .................. C08F 2/00
[52] U.S. Cl. .................. 526/62; 526/195; 526/233; 526/234; 526/236; 524/701; 524/711; 524/714; 524/729; 524/740; 524/745; 524/779; 422/131
[58] Field of Search ............ 526/62, 195, 233, 234, 526/236; 524/701, 711, 714, 729, 740, 745, 779

[56] References Cited

U.S. PATENT DOCUMENTS 3,825,434 7/1974 Berens et al.
4,256,864 3/1981 Cohen .................. 422/131
4,542,195 9/1985 Shimizu et al. .................. 526/62
4,933,399 6/1990 Shimizu et al. .................. 526/62

FOREIGN PATENT DOCUMENTS 62230 10/1982 European Pat. Off.
320227 6/1989 European Pat. Off.

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition in a polymerization vessel during polymerization of a monomer having an ethylenically double bond, wherein said polymerization is carried out in a polymerization vessel of which the inner wall has been previously first coated with (A) a coating solution comprising a condensate of an aromatic compound and at least one member selected from the group consisting of metal compounds and inorganic colloids, and the coating thus formed has been then coated with (B) a coating solution comprising at least one member selected from the group consisting of anionic polymeric compounds, amphoteric polymeric compounds and hydroxyl group-containing polymeric compounds; and a polymerization vessel having a coating thus formed. According this method, polymer scale deposition on the inner wall, etc. of the polymerization vessel can be effectively prevented.

14 Claims, No Drawings

METHOD OF PREVENTING POLYMER SCALE DEPOSITION IN A POLYMERIZATION VESSEL

BACKGROUND OF THE INVENTION

1. Field of the Invention

The present invention relates to a method of preventing polymer scale deposition on the inner wall and so forth of a polymerization vessel during polymerization of a monomer having an ethylenically double bond.

2. Description of Prior Art

In processes of preparing polymers by polymerizing a monomer in a polymerization vessel, the problem that polymers deposit on the inner wall and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the workers may be exposed to the unreacted monomer, which may give them some physical disorders.

Heretofore, there are known methods for preventing polymer scale deposition in which the inner wall and so forth are coated with various materials as polymer scale preventive agents, for example, particular polar compounds (Japanese Patent Publication (KOKOKU) No. 30343/1970); dyes or pigments (Japanese Patent Publication (KOKOKU) No. 30835/1970); particular linear or branched polyaromatic amines (Japanese Patent Publication (KOKOKU) No. 16561/1984); condensates prepared by reacting an aromatic amine compound with an aromatic nitro compound in the presence of a condensation catalyst at 100° to 250° C., or the basic form thereof produced by treatment with an alkali metal salt or ammonium compound (Japanese Patent Publication (KOKOKU) No. 30681/1985); and a quinone-amine compound with an average molecular weight of 3,000 or more prepared by subjecting an aromatic amine and an aromatic quinone to addition reaction in a solvent having a solubility parameter of 9.0 to 12.2 or a mixed solvent containing said solvent and an alcohol (Japanese Pre-examination Patent Publication (KOKAI) No. 7309/1986); a reaction product of a phenolic compound with an aromatic aldehyde (Japanese Pre-examination Patent Publication (KOKAI) No. 54317/1980); a reaction product of a phenol compound with an aromatic aldehyde (Japanese Pre-examination Patent Publication (KOKAI) No. 54317/1980); a self-condensation product of a polyhydric phenol dissolved in an aqueous alkali metal salt solution; a reaction product of pyrogallol with an aldehyde (Japanese Patent Publication (KOKOKU) No. 59246/1985); a reaction product of pyrogallol or a hydroxyhydroquinone with an aromatic aldehyde (Japanese Pre-examination Patent Publication (KOKAI) No. 192413/1982).

These methods are effective in preventing polymer scale deposition, in the case where the monomer to be polymerized is vinyl halide such as vinyl chloride or a monomer mixture containing a large amount of vinyl chloride and a small amount of other monomers copolymerizable therewith. However, in the case where the monomer having an ethylenically double bond to be polymerized mainly comprises styrene, α-methylstyrene, acrylate, acrylonitrile or the like, which have so high a dissolving power against the coatings formed by the above prior art methods, the coatings may be partly or completely dissolved away. Consequently, it becomes impossible to prevent the deposition of polymer scale.

There are also known methods for preventing polymer scale deposition in which the inner wall of a polymerization vessel is coated with the following compounds: a mixture of a water-soluble anionic polymeric compound (Japanese Pre-examination Patent Publication (KOKAI) No. 112903/1981); a cellulose or a cellulose derivative (Japanese Patent Publication (KOKOKU) No. 14444/1983); alginic acid or a metal salt thereof (Japanese Patent Publication (KOKOKU) No. 14445/1983); or a starch or a derivative thereof (Japanese Patent Publication (KOKOKU) No. 14447/1983). Although the coatings formed by these methods are not readily dissolved by monomers, the scale preventing effect achieved varies largely depending on the kind of monomer, suspending agent, catalyst, or the like used in the polymerization. Particularly, in the case of the polymerization of styrene, α-methylstyrene, acrylates, acrylonitrile or the like, polymer deposition is not prevented sufficiently.

SUMMARY OF THE INVENTION

Accordingly, it is an object of the present invention to provide a method of preventing polymer scale deposition on the inner wall of a polymerization vessel during polymerization of not only vinyl halide but also extensive other monomers having an ethylenically double bond.

The present inventors have discovered that a specific double coating composed of an undercoat of a condensate of an aromatic compound, a metal compound, etc. and a overcoat of a particular polymeric compound, which are known themselves separately, can unexpectedly prevent the deposition polymer scale on the inner wall, etc.

Thus, the present invention provides, as a means of solving the prior art problems, a method of preventing polymer scale deposition in a polymerization vessel during polymerization of a monomer having an ethylenically double bond, wherein said polymerization is carried out in a polymerization vessel of which the inner wall has been previously first coated with (A) a coating solution comprising an aromatic condensate and at least one member selected from the group consisting of metal compounds and inorganic colloids, and the coating thus formed has been then coated with (B) a coating solution comprising at least one member selected from the group consisting of anionic polymeric compounds, amphoteric polymeric compounds and hydroxyl group-containing polymeric compounds.

The present invention also provides the polymerization vessel of which the inner wall has a coating formed as described above.

According to the present invention, polymer scale deposition can be effectively prevented in the polymerization of monomers having an ethylenically double bond. Particularly, even in the case of polymerizing monomers having high dissolving power such as styrene, α-styrene, acrylates and acrylonitrile, polymer scale deposition can be prevented. Therefore, the operation of removing polymer scale is not required to be conducted every polymerization run; hence productivity is markedly improved. And polymers of high quality can be produced stably. In particular, even in the case of polymerization in a stainless steel polymerization vessel, in which polymer deposition has been liable to occur so far, polymer deposition can be effectively prevented.

DETAILED DESCRIPTION

Coating Solution (A)

The coating solution (A) contains an aromatic condensate and at least one member selected from the group consisting of metal compounds and inorganic colloids

Aromatic Condensate

The term "aromatic condensate" herein means a condensate of one or more aromatic compounds such as an aromatic amine, an aromatic nitro compound, an aromatic quinone compound, an azo compound, a nitroso compound and a polyhydric phenol. Such aromatic condensates include, for example, the following compounds.

(1) The condensate prepared by reacting an aromatic amine compound with an aromatic nitro compound in the presence of a condensation catalyst at 100° to 250° C., or the basic form thereof produced by treatment with an alkali metal salt or ammonium compound, disclosed in Japanese Patent Publication (KOKOKU) No. 30681/1985.

The aromatic amine compound used as a starting material is represented by the general formula (I):

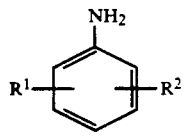

wherein $R^1$ represents a hydrogen atom, —NH$_2$, —Cl, —N=N—C$_6$H$_5$, —OH, —COCH$_3$, —OCH$_3$, —NH—C$_6$H$_5$, —NH—C$_6$H$_4$—NH$_2$, —NH—C$_6$H$_4$—CH$_3$ —N(CH$_3$)$_2$, —NH—C$_6$H$_4$—OH, —NH—CO—CH$_3$ or an alkyl group having 1 to 3 carbon atom; and $R^2$ represents a hydrogen atom, —NH$_2$, —OH or —CH$_3$.

The aromatic amine compound having the general formula (I) includes, for example, aniline, o-, m- or p-phenylenediamine, o-, m- or p-aminophenol, o-, m- or p-chloroaniline. p-aminoazobenzene, 2,4-diaminoazobenzene, p-aminoacetoanilide, o-, m- or p-methylaniline, 4-aminodiphenylamine, 2-aminodiphenylamine, 4,4-diaminodiphenylamine, N,N-dimethyl-p-phenylenediamine, 4-amino-3'-methoxydiphenylamine, 4-amino-4'-hydroxydiphenylamine, 4-chloro-o-phenylenediamine, 4-methoxy-o-phenylenediamine, 2-amino-4-chlorophenol, and 2,3-diaminotoluene.

The aromatic nitro compound used as another starting material is represented by the general formula:

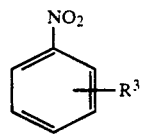

wherein $R^3$ represents a hydrogen atom, —OH, —OCH$_3$, —OC$_2$H$_5$, —Cl, —NH$_2$, —COOH, or —SO$_3$H.

The aromatic nitro compound having the general formula (II) includes, for example, nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, nitrobenzene, o-, m- or p-nitrobenzenesulfonic acid, o-, m- or p-nitroaniline, 2-nitro-p-phenylenediamine, 2-amino-4-nitrophenol, 2-amino-5-nitrophenol, and 4-amino-2-nitrophenol.

According to the preparation process described in Japanese Patent Publication (KOKOKU) No. 30681/1985, first, at least one of the aromatic amine compounds of the general formula (I) and at least one of the aromatic nitro compounds of the general formula (II) are subjected to condensation reaction in the presence of a mineral acid and a condensation catalyst at a temperature of from 100° to 250° C. to produce the condensate of these two compounds. The aromatic nitro compound is preferably used in an amount of 0.15 to 0.50 mole per mole of the aromatic amine compound. The condensation catalyst is preferably used in an amount of 0.10 to 0.50 mole, and the mineral acid is used in an amount of 0.20 to 0.50 mole, per mole of the aromatic amine compound. The mineral acid used includes, for example, hydrochloric acid, nitric acid, oxalic acid, phosphoric acid and sulfuric acid. The condensation catalyst used includes, for example, permanganic acid and its salts such as potassium permanganate, chromic acid related compounds such as chromium trioxide, potassium dichromate and sodium chlorochromate, nitric acid and its salts such as silver nitrate and lead nitrate, halogens such as iodine, bromine, chlorine and fluorine, peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide, oxy acids and the salts thereof such as iodic acid, potassium iodate and sodium chlorate, metal salts such as ferrous chloride, ferric chloride, copper sulfate, cuprous chloride, cupric chloride and lead acetate, oxygen compounds such as molecular oxygen and ozone, oxides such as copper oxides, mercury oxides, cerium oxides, manganese dioxide and osmic acid.

The basic form of the above condensate is prepared by, for example, dispersing 100 parts by weight of said condensate in water, adding 10 to 20 parts by weight of an alkali or ammonium compound to the dispersion, and then heating the mixture at 90° to 140° C. The amount of the alkali or the ammonium compound may be enough to neutralize the mineral acid used in the condensation. The alkali or the ammonium compound used includes, for example, NaOH, KOH, Na$_2$CO$_3$, NH$_4$OH, (NH$_4$)$_2$CO$_3$, and the like.

Among the condensates of the aromatic amine compound with the aromatic nitro compound, and the basic forms thereof, preferred are, for example, condensates of aniline with nitrobenzene, condensates of aniline and p-aminodiphenylamine with nitrobenzene, condensates of aniline and o-aminophenol with o-oxynitrobenzene, and condensates of aniline and p-aminophenol with o-oxynitrobenzene. Specifically Condensate Nos. 3, 5, 7, 10, 17 and 18 are preferable examples.

(2) The linear or branched polyaromatic amine with a molecular weight of about 250 or more described in Japanese Patent Publication (KOKOKU) No. 16561/1984 and Japanese Patent Publication (KOKOKU) No. 54323/1985.

This polyaromatic amine includes the ones represented by the following formulas (III) or (IV).

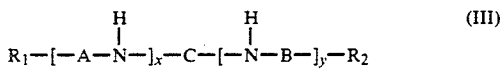

wherein $R_1$ and $R_2$ may be the same or different and each represent a hydrogen atom, —OH, —NH$_2$, or the group:

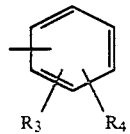

where $R_3$ and $R_4$ may be the same or different and each represent a hydrogen atom, —OH, —NH$_2$, a halogen atom, or an alkyl group having 1 to 8 carbon atoms, and A, B and C may be the same or different and each represent the group:

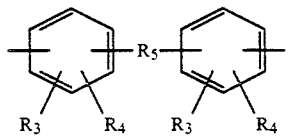

where $R_3$ and $R_4$ are the same as defined above, and and $R_5$ is

or a linear or branched alkylene group or alkylidene group having 1 to 5 carbon atoms, or the group:

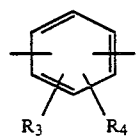

where $R_3$ and $R_4$ are the same as defined above, x is an integer of from 1 to 20, and y is an integer of from 0 to 20, and each repeated unit may be the same or different.

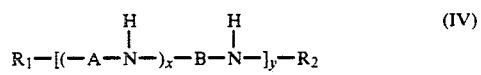

wherein $R_1$, A and B are the same as defined in respect of said formula (III), $R_2$ represents a hydrogen atom, —OH or the group:

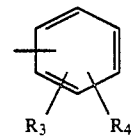

where $R_3$ and $R_4$ are the same as defined in respect of said formula (III), x is an integer of from 1 to 4, and y is an integer of from 1 to 15.

Said polyaromatic amine can be prepared by subjecting one or more of the compounds (a) to (d) described below to condensation, provided that if only one compound is used, it must have an amino group; if two or more compounds are used, at least one of them must have an amino group. In the case where 3 or more of compounds are used, at least two thereof preferably have an amino group.

(a) The polyaminobenzene having the formula:

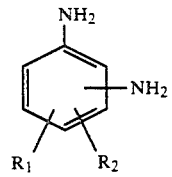

wherein $R_1$ and $R_2$ may be the same or different and each represent a hydrogen atom, a halogen atom such as a chlorine, bromine, iodine or fluorine atom, —NH$_2$, —OH, or an alkyl group having 1 to 8 carbon atoms, Examples of this polyaminobenzene include o-, m- or p-phenylenediamine; diaminotoluene, diaminoxylene, diaminophenol, and triaminobenzene, toluene, and xylene; ethyl, proplyl, butyl or pentyl-di or tri-aminobenzene. Most preferred are the compounds in which R is a hydrogen atom, and $R_2$ is a hydrogen atom, the methyl group, or the ethyl group.

(b) The polyhydric phenol having the formula:

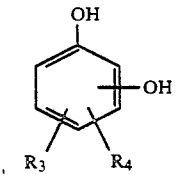

wherein $R_3$ and $R_4$ may be the same or different and each represent a hydrogen atom, a halogen atom such as a chlorine, bromine, iodine or fluorine atom, —NH$_2$, —OH, or an alkyl group having 1 to 8 carbon atoms, Examples of this polyhydric phenol include catecol, resorcinol, chlororesorcinol, hydroquinone, phloroglucinol, pyrogallol, and the like; dihydroxy-toluene or -xylene; trihydroxy-toluene or -xylene; ethyl, propyl, butyl or pentyl-di or tri-hydroxybenzene and the like. Most preferred are the compounds in which $R_3$ is a hydrogen atom, and $R_4$ is a hydrogen atom or —OH.

(c) The amino phenol or the alkyl-substituted amino phenol having the formula:

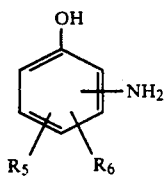

wherein $R_5$ and $R_6$ may be the same or different and each represent a hydrogen atom, a halogen atom such as a chlorine, bromine, iodine or fluorine atom, $-NH_2$, $-OH$, or an alkyl group having 1 to 8 carbon atoms. Examples of the compound include o-, m- or p-aminophenol; diamino- or triamino-phenols; and methyl- ethyl-, propyl-, butyl- or pentyl-amino or diaminophenols. Most preferred are the compounds in which $R_5$ is a hydrogen atom, and $R_6$ is a hydrogen atom or $-NH_2$.

(d) Diphenyl amine, alkyl-substituted diphenylamines, and the compound having the following formula:

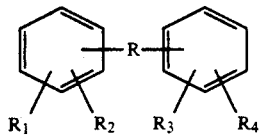

wherein R represents

or a linear or branched alkyl group having 1 to 5 carbon atoms, and $R_1$, $R_2$, $R_3$ and $R_4$ are each represent a hydrogen atom, a halogen atom such as a chlorine, bromine, iodine or fluorine atom, $-NH_2$, $-OH$ or an alkyl group having 1 to 8 carbon atoms, provided that at least two of them are $-NH_2$ or $-OH$. The compound of the above formula includes, for example, bisphenol A. Most preferred are the compounds in which $R_1$ an $R_4$ are $-OH$ or $-NH_2$, and $R_2$ and $R_3$ are a hydrogen atom.

Among the polyaromatic amines described above, preferred are those prepared by subjecting a reactant mixture containing said polyaminobenzene and said polyhydric phenol to condensation together; for example, the condensate of m-phenylenediamine and resorcinol, the condensate of m-phenylenediamine, resorcinol and p-aminophenol; and the condensate of m-phenylenediamine, resorcinol, phloroglucinol and p-aminophenol.

The above condensation is usually carried out in the presence of an acid catalyst such as hydrochloric acid under heating. Preferable reaction conditions about the acid catalyst, catalyst concentration, etc. are described in detail in Japanese Patent Publication (KOKOKU) No. 16561/1984.

(3) The quinone-amine compound with an average molecular weight of 3,000 or more prepared by addition reaction of an aromatic diamine with an aromatic quinone in a solvent having a solubility parameter of 9.0 to 12.2 or a mixed solvent containing said solvent and an alcohol in an amount not more than that of said solvent (Japanese Pre-examination Patent Publication (KOKAI) No. 7309/1986).

The aromatic quinone used in the preparation of said quinone-amine compound includes, for example, benzoquinones, naphthoquinones, phenanthrenequinone, and their derivatives formed by substitution on an aromatic ring with at least one of a chlorine atom, bromine atom, methyl group, alkoxyl group, and hydroxyl group.

The aromatic diamine includes, for example, phenylene diamines, diaminonaphthalenes, diaminoacridines, diaminopyridines, diaminopyrimidines, diaminofluorenes, diaminoazobenzenes, diaminobenzidines and diaminodiphenylamines, and their derivatives formed by substitution on the ring with an alkyl group, aryl group, alkoxyl group, halogen atom, hydroxyl group, mercapto group, nitro group, etc.

The solvent having a solubility parameter of 9.0 to 12.2 used includes, for example, polar non-protonic solvents such as tetrahydrofuran, dimethylformamide, dimethyl acetamide, actonitrile, acetone, methyl ethyl ketone, diethyl ketone, methyl isobutyl ketone, methyl n-butyl ketone, methyl n-propyl ketone, and dioxane. These may be used singly or in combination of one or more. The alcohol which may be added optionally includes, for example, methanol and ethanol, which can be used suitably. The selection of solvent or addition of alcohol makes it possible to control the molecular weight of the quinone-amine compounds formed.

The reaction of the aromatic diamine with the aromatic quinone is normally conducted at 10° to 70° C. The aromatic quinone is normally used in an amount of about 1 to 5 moles per mole of the aromatic diamine. Other reaction conditions are described in detail in Japanese Pre-examination Patent Publication (KOKAI) No. 7309/1986.

Among the quinone-amine compounds, preferred are the condensate of diaminonaphthalene with benzoquinone, the condensate of phenylenediamine with benzoquinone, and the condensate of diaminodiphenylamine with benzoquinone.

(4) The condensates disclosed in Japanese Patent Publication (KOKOKU) No. 3841/1987 (or U.S. Pat. No. 4,080,173), which is incorporated herein by reference. That is, (1) a self-condensation product of a polyhydric phenol such as a dihydric or trihydric phenol, (2) a condensation product of two or more kinds of polyhydric phenols such as dihydric or trihydric phenols, and (3) a self-condensation product of a polyhydric naphthol.

The polyhydric phenol include, for example, dihydric phenols such as resorcinol, hydroquinone and catechol, and trihydric phenols such as phloroglucinol and pyrogallol. The polyhydric phenol includes, for example, 2,7-dihydroxynaphthalene, 3,7-dihydroxynaphthalene and 2,6-dihydroxynaphthalene. Preferred are the self-condensation products and co-condensation products of resorcinol and hydroquinone, and self-condensation products of pyrogallol.

These condensates can be prepared by heating one or more of polyhydric phenols or a polyhydric naphthol at about 210° C. to about 310° C. in an inert atmosphere such as nitrogen or argon for about 10 to 500 min. or 8 hours. For the reaction, various catalysts can be used, such as zinc chloride, aluminum chloride, sodium hydroxide and the like. The catalyst is usually present in an amount of about 0.05 to 0.50 mole per mole of the reactants. The preparation process is described in more detail in Japanese Patent Publication (KOKOKU) No. 3841/1987 or U.S. Pat. No. 4,080,173.

(5) The reaction product of pyrogallol and an aldehyde disclosed in Japanese Patent Publication (KOKOKU) No. 59246/1985 (or U.S. Pat. No. 4,320,215), which is incorporated herein by reference, containing a unit in its molecular represented by the general formula:

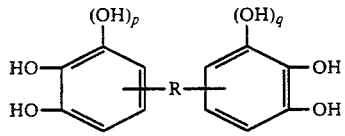

Wherein R represents a divalent hydrocarbon group having from 1 to 30 carbon atoms, and p and q are an integer of 0 or 1;

The reaction product is exemplified by those having the following units: 1,1-bis(2,3,4-trihydroxyphenyl)-phenylmethane and 1,1-bis(2,3,4-trihydroxyphenyl)-decane.

Said reaction product can be prepared by reacting the pyrogallol compound having the general formula:

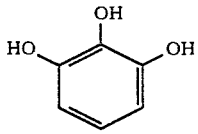

with a variety of aldehydes under the acidic conditions in an aqueous medium. The aldehyde used includes, for example, aliphatic aldehydes such as decyl aldehyde and formaldehyde, and aromatic aldehydes such as benzaldehyde and ones having various substituents such as a methyl group and ethyl group on the benzene ring. The aromatic aldehydes are preferred. The aldehyde is used in an amount of 0.1 to 1 mole per mole of pyrogallol. The conditions of preparation are described in more detail in Japanese Patent Publication (KOKOKU) NO. 59246/1985 or U.S. Pat. No. 4,320,215.

(6) The condensate of pyrogallol or a hydroxyhydroquinone with an aromatic aldhyde disclosed in Japanese Pre-examination Patent Publication (KOKAI) No. 192413/1982 (or U.S. Pat. No. 4,555,555), which is incorporated herein by reference, and represented by the general formula:

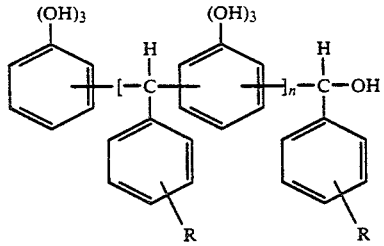

wherein, R represents a hydrogen atom or an alkyl group having 1 to 10 carbon atoms and n is an integer of 0 or more.

This condensate can be obtained by allowing pyrogallol or hydroxyhydroquinone and an aromatic aldehyde to condensate under acidic conditions in an aqueous medium or an organic solvent at a temperature of 40° C. to 120° C. to form a reaction product, and then subjecting the reaction product to extraction treatment with an ether to separate an insoluble portion, which is subjected to extraction treatment with a polar solvent such as methanol, ethyl acetate or the like. The aldehyde used includes, for example, benzaldehyde and its derivatives having a substituent such as a methyl group or an ethyl group. The aromatic aldehyde is usually used in an amount of about 0.1 to 10 moles per mole of the pyrogallol or the hydroxyhydroquinone. The other preparation conditions are described in more detail in Japanese Pre-examination Patent Publication (KOKAI) No. 192413/1982 or U.S. Pat. No. 4,555,555.

Said condensate includes, for example, the condensate of pyrogallol with benzaldehyde, and the condensate of a hydroxyhydroquinone with benzaldehyde.

Among the aromatic condensates of the above (5) and (6), preferred examples are the condensate of pyrogallol and benzaldehyde, the one of hydroxyhydroquinone with benzaldehyde, and the one of pyrogallol with formaldehyde.

The aromatic condensates described above can be used singly or in combination of two or more.

Metal Compounds and Inorganic Colloids

The metal compound which may be used as a component of the coating solution (A) includes, for example, silicates, carbonates, phosphates, sulfates, nitrates, borates, acetates, hydroxides, oxides and halides of metals such as alkaline metals such as sodium and potassium, alkaline earth metals such as magnesium, calcium and barium, aluminum family metals such as aluminum, tin family metals such as titanium and tin, iron family metals such as iron and nickel, chromium family metals such as chromium and molybdenum, manganese family metals such as manganese, copper family metals such as copper and silver, platinum family metals such as platinum.

Among the metal compounds, preferred are silicates of magnesium, calcium, aluminum and titanium; phosphates of magnesium, calcium, barium and titanium; sulfates of titanium, tin, iron and nickel; and hydroxides of magnesium, calcium, aluminum and iron.

The inorganic colloid which may be used includes, for example, gold colloid, silver colloid, sulfur colloid, colloid of ferric hydroxide, colloid of stannic acid, colloid of silicic acid, colloid of manganese dioxide, colloid of molybdenum oxide, colloid of barium sulfate, colloid of vanadium pentoxide, colloid of aluminum hydroxide, and colloid of lithium silicate. These inorganic colloids can be prepared by mechanical crushing, irradiation with ultrasonic wave, electrical dispersion or chemical methods.

Among the inorganic colloids, preferred are colloid of ferric hydroxide, colloid of aluminum hydroxide, colloid of stannic acid, colloid of silicic acid, colloid of aluminum hydroxide, and colloid of lithium silicate.

These metal compounds and inorganic colloids can be used singly or in combination of two or more.

Preparation of the Coating Solution (A)

The coating solution (A) can be prepared by dissolving or dispersing (i) the aromatic condensate and (ii) at least one compound selected from the metal compounds and inorganic colloids in a solvent. The ratio of these, (i)/(ii), by weight preferably ranges from 100/0.1 to 100/500, more preferably from 100/5 to 100/200. The total concentration of these components in the coating solution (A) is not limited as long as a preferred coating weight described later is achieved, but normally it preferably ranges from about 0.001 to about 5% by weight.

The solvent used for preparation of the coating solution (A) include, for example, water; alcohols such as methanol, ethanol, propanol, 1-butanol, 2-butanol, 2-methyl-1-propanol, 2-methyl-2-propanol, 3-methyl-1-butanol, and 2-methyl-2-butanol, 2-pentanol; aliphatic hydrocarbons such as n-hexane, n-heptane and the like; aromatic hydrocarbons such as benzene, toluene, and xylene; halogenated hydrocarbons such as chloroethylene, 1-chlorobutane, chloropentane, dichloroethylene, and 1,1,2-trichloroethane; ketones such as acetone, methyl ethyl ketone, and methyl isobutyl ketone; esters such as methyl formate, ethyl formate, methyl acetate, and methyl acetoacetate; ethers such as 4-methyl dioxolan, and ethylene glycol diethyl ether; furans; and aprotic solvents such as dimethylformamide, dimethyl sulfoxide, and acetonitrile. These solvents are appropriately used singly or as a mixed solvent of two or more.

Coating Solution (B)

The coating solution (B) contains at least one member selected from the group consisting of anionic polymeric compounds, amphoteric polymeric compounds, and hydroxyl group-containing polymeric compounds.

Anionic Polymeric Compounds

The anionic polymeric compounds which may used include, for example, anionic polymeric compounds having a carboxyl group or sulfonic acid group as its side chain as exemplified by sulfomethylated compounds of polacrylamide, polyacrylic acid, alginic acid, an acrylamide/vinylsulfonic acid copolymer, polymethacrylic acid and poystyrenesulfonic acid, or alkali metal salts or ammonium salts of these, and carboxymethyl cellulose.

Among the above anionic polymeric compounds, preferred are polyacrylic acid, sodium salts of carboxymethyl cellulose, and alginic acid.

Amphoteric Polymeric Compounds

The amphoteric polymeric compounds which may be use used include, for example, glue, gelatin, casein, and albumin. Of these, gelatin and albumin are preferred.

Hydroxyl Group-Containing Polymeric Compounds

The hydroxyl group-containing polymeric compound includes, for example, starches such as amylose, amylopectin, dextrin and oxidized starch; animal viscous liquid materials such as chitin; cellulose derivatives such as methyl cellulose, glycol cellulose, cellulose methylene ether, methyl ethyl cellulose, hydroxyethyl cellulose, and hydroxyethyl methyl cellulose; hemicelluloses such as xylan, mannan, arabogalactan, galactan, and araban; lignins such as alcohol lignin, dioxane lignin, phenol lignin, hydrotropic lignin, mercaptolignine, alkali lignin, thioalkali lignin, acid lignin, cuproxam lignin, and periodate lignin; tannins such as gallotannin; phenolformaldehyde resins; and partially saponified polyvinyl alcohols. Among these, preferred are amylopectin, dextrin, methyl cellulose, glycol cellulose, mannan, galactan, alcohol lignin, dioxane lignin, alkali lignin, and acid lignin.

These may be used singly or in combination of two or more.

Preparation of the Coating Solution (B)

The coating solution (B) may be prepared by dissolving one or more said polymeric compounds in a suitable solvent, for example, in a concentration of from about 0.01 to 5.0% by weight.

The solvents which may be used include water and organic solvents compatible with water, for example, alcohols, esters, and ketones, which may be used singly or as a mixed solvent of two or more.

Formation of Coating

According to the method of the invention, first, the coating solution (A) is applied to the inner wall surface of the polymerization vessel, followed by drying to form a first coating. Drying may be carried out, for example, at a temperature of from room temperature to 100° C. The coating solution is preferably applied to other parts of the polymerization vessel with which the monomer comes into contact during polymerization, in addition to the inner wall. Such parts include, for example, stirring blades, a stirring shaft, a condenser, a header, baffles, search coils, bolts, nuts, etc.

Moreover, preferably, the coating solution is also applied to parts of recovery system for an unreacted monomer with which the unreacted monomer may come into contact, for example, the inner surfaces of monomer distillation columns, condensers, monomer stock tanks and valves. Scale formation can be thereby prevented at these parts.

The first coating thus formed has normally a coating weight of at least 0.001 g/m$^2$, preferably from 0.001 to 5 g/m$^2$, and more preferably 0.05 to 2 g/m$^2$.

Subsequently, the coating solution (B) is applied onto the first coating made from the coating solution (A), and then dried to form a second coating. The drying operation may be conducted, for example, at a temperature of from room temperature to 100° C. The second coating made from the coating solution (B) has preferably a coating weight of at least 0.001 g/m$^2$, more preferably from 0.001 to 5 g/m$_2$, still more preferably from 0.05 to 2 g/m$^2$.

The method of applying the coating solution (A) or (B) is not particularly limited, and includes typically the brush coating, spray coating, the method of filing the polymerization vessel with the coating solution followed by withdrawal thereof, and automatic coating methods as disclosed in Japanese Pre-examination Patent Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, air heated to a suitable temperature is blown to the coated surface to dry it, and a method in which the inner wall surface of a polymerization vessel and other parts to be coated are previously heated, and the coating solution is directly applied on the heated inner wall surface, etc. After dried, the coated surfaces are washed with water if necessary.

The coating operation may be conducted every polymerization run or every several polymerization runs as necessary, thereby the polymerization vessel can be used repeatedly without deposition of polymer scale.

Polymerization

After the formation of the coating on the inner wall surface of a polymerization vessel, etc., polymerization is carried out in accordance with conventional procedures. That is, a monomer having an ethylenically double bound, a polymerization initiator, and other necessary additives such as a dispersing agent for the monomer, and optionally a polymerization medium are charged into the polymerization vessel, followed by carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters of salts of these; maleic acid or fumaric acid, and esters or anhydrides thereof; and diene monomers such as butadiene, chloroprene and isoprene; as well as styrene, $\alpha$-methylstyrene, acrylates, acrylonitrile, halogenated vinylidenes, and vinyl ethers.

There are no particular limitations on the form of polymerization to which the method of this invention can be applied. The invention is effective in any forms of polymerization such as suspension polymerization, emulsion polymerization, solution polymerization and bulk polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 0.1 mmHg to about 760 mmHg, charging a monomer (whereupon the pressure inside the polymerization vessel usually becomes from 0.5 to 30 kg.cm$^{-2}$), polymerizing the monomer at a temperature of from about $-10°$ C. to 150° C., and optionally adding at least one of water, the dispersing agent and polymerization initiator during polymerization. The polymerization is judged to be completed when the pressure inside the vessel falls to from about 0 to about 7 kg.cm$^{-2}$G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to 250° C.

The method of this invention is effective regardless of the materials constituting the inner wall, etc. of a polymerization vessel. That is, this method is effective for any type of polymerization vessels having inner wall made of stainless steel or glass for lining.

Accordingly, any additive materials that are commonly added in a polymerization system can be used without any limitation. More specifically, the method of this invention can effectively prevent polymers from depositing, even in polymerization systems in which such additives are present as exemplified by suspension agents such as partially saponified polyvinyl alcohol, methyl cellulose and polyacrylate; solid dispersants such as calcium phosphate and hydroxyapatite; anionic emulsifying agents such as sodium lauryl sulfate, sodium dodecylbenzenesulfonate and sodium dioctylsulfosuccinate; nonionic emulsifying agents such as sorbitan monolaurate and polyoxyethylene alkyl ether; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters; and polymerization catalysts such as diisopropyl peroxydicarbonate, $\alpha,\alpha'$-azobis-2,4-dimethylvaleronitrile, lauroyl peroxide, potassium persulfate, cumene hydroperoxide and p-menthane hydroperoxide.

The polymerization for which the method of this invention can be particularly suitably carried out include, for example, suspension polymerization or emulsion polymerization of vinyl halides such as vinyl chloride or vinylidene halides or a monomer mixture mainly comprised of any of these. The method is also suited to polymerizations for which polymerization vessels made of stainless steel are mainly used, for example, polymerizations for preparing beads or latexes of polymers such as polystyrene, polymethyl methacrylate and polyacrylonitrile, preparing synthetic rubbers such as SBR, NBR, CR and IIR (these synthetic rubbers are commonly prepared by emulsion polymerization), and preparing ABS resins.

EXAMPLES

The method of the present invention is now described by way of working examples and comparative examples. In each of the tables below, Experiment Nos. marked with * are comparative examples, and the other Experiment Nos. are working examples of the present invention.

EXAMPLES OF PREPARATION OF AROMATIC CONDENSATES

(1) Preparation of Condensate No. 1

A mixture of 1.00 mole of aniline, 0.310 mole of hydrochloric acid, 0.227 mole of nitrobenzene and 0.103 mole of ferrous chloride was heated at 60° C. for 6 hours, and then heated up to 180°–185° C., which temperature was maintained to allow the mixture to react, with water being distilled away. During the reaction, aniline and nitrobenzene distilled together with the water. The distilled aniline and nitrobenzene were recovered and returned to the reaction vessel. Then, the inner temperature of the reaction vessel was raised to 200° C., at which the reaction mixture was heated 5 hours.

The reaction mixture obtained (the molten material) was put in a dilute sulfuric acid and heated at 60° C. for 3 hours, and then it was filtered before cooled, thereby unreacted aniline was removed. Subsequently, the product was washed with water 5 to 6 times, thereby hydrochloric acid being removed, followed by drying to give a condensate (Condensate No. 1).

(2) Preparation of Condensate No. 2

A mixture of 1.00 mole of m-phenylenediamine, 0.10 mole of hydrochloric acid and 0.83 mole of resorcinol was heated at 60° C. for 1 hour, and then heated up to 300° C. over 2 hours while ammonia generating was removed. At the time the temperature reached 300° C., cooling was started and the temperature was returned to room temperature in 1 hour to give a solid condensate (Condensate No. 2).

(3) Preparation of Condensate No. 3

Three moles of pyrogallol was dissolved in 2 liters of water. Benzaldehyde (2 moles) and phosphoric acid (6 moles) were added to the solution of pyrogallol, and then the compounds were allowed to react at 100° C. for 4 hours.

The reaction mixture thus obtained was filtered, and the product filtered off was washed with hot water 5 to 6 times, so that excessive phosphoric acid was removed. Thereafter, the product was dried to give a condensate (Condensate No.3).

EXAMPLE 1

Polymerization was conducted using a stainless steel polymerization vessel with a inner capacity of 1,000 liters and having a stirrer.

In each experiment, first, an aromatic condensate was dissolved in methanol in a concentration of 0.5% by weight, and then a metal compound or inorganic colloid was added thereto so that the weight ratio of the aromatic condensate/the metal compound or inorganic colloid might become a predetermined value; a coating solution (A) was thereby prepared. The coating solution (A) was applied to the inner wall and other parts with which a monomer comes into contact, such as stirring blades and baffles. The wet coated surfaces were heated and dried at 50° C. for 15 min., followed by washing with water.

Subsequently, a coating solution (B) containing an anionic polymeric compound, amphoteric polymeric compound and/or hydroxyl group-containing polymeric compound dissolved in water was applied to the wall and so forth coated as above. After that, the wet surfaces were dried, and then washed with water.

Table 1 shows (i) the aromatic condensate, (ii) the metal compound or inorganic colloid, the weight ratio of (i)/(ii) in the coating solution (A) used in each experiment, as well as the anionic polymeric compound, amphoteric polymeric compound, or hydroxyl group-containing polymeric compound and the conditions of the application and drying of the coating solution (B) in each experiment. However, Experiment Nos. 101 to 106 and 116 to 121 are comparative examples in which no coating solution was applied, or only any one of the coating solution (A) and coating solution (B) was applied.

In the polymerization vessel thus coated were charged 400 kg of water, 260 kg of styrene, 140 kg of acrylonitrile, 400 g of a partially saponified polyacrylamide, and 1.2 kg of α,α'-azobisisobtyronitrile. Polymerization was then carried out at 90° C. for 5 hours with stirring. After the completion of polymerization, the amount of polymer scale depositing on the inner wall of the polymerization vessel was measured.

The results are given in Table 1.

TABLE 1

| Exp. No. | Coating solution (A) | | | Coating solution (B) | | | | Amount of scale (g/m²) |
|---|---|---|---|---|---|---|---|---|
| | (i) No. of Aromatic Condensate | (ii) Metal compound or inorganic colloid | (i)/(ii) weight ratio | Anionic or amphoteric polymer | Concentration (wt. %) | Coating temp., (°C.) | Time for drying | |
| 101* | — | — | — | — | — | — | — | 1200 |
| 102* | 1 | — | 100/0 | — | — | — | — | 860 |
| 103* | — | — | — | Gelatin | 1.0 | 50 | 15 | 850 |
| 104* | — | Ferrous hydroxide colloid | 0/100 | — | — | — | — | 1000 |
| 105* | — | " | 0/100 | Gelatin | 1.0 | 50 | 15 | 800 |
| 106* | 1 | " | 100/50 | — | — | — | — | 45 |
| 107 | 1 | " | 100/50 | Gelatin | 1.0 | 50 | 15 | 0 |
| 108 | 1 | " | 100/30 | " | 0.5 | 50 | 30 | 0 |
| 109 | 1 | Aluminum chloride | 100/60 | Albumin | 1.0 | 70 | 20 | 0 |
| 110 | 1 | Sulfur colloid | 100/150 | Alginic acid | 1.0 | 50 | 20 | 0 |
| 111 | 1 | Silicic acid colloid | 100/5 | Polyacrylic acid | 0.5 | 80 | 10 | 0 |
| 112 | 2 | Ferrous hydroxide colloid | 100/50 | Gelatin | 1.0 | 50 | 20 | 0 |
| 113 | 2 | Aluminum hydroxide colloid | 100/100 | Albumin | 1.0 | 50 | 20 | 0 |
| 114 | 3 | Ferrous hydroxide colloid | 100/10 | Gelatin | 1.0 | 50 | 15 | 0 |
| 115 | 3 | Silicic acid colloid | 100/150 | " | 0.5 | 80 | 10 | 0 |
| 116* | — | — | — | — | — | — | — | 1200 |
| 117* | 1 | — | 100/0 | — | — | — | — | 860 |
| 118* | — | — | — | Glycol cellulose | 1.0 | 50 | 20 | 870 |
| 119* | — | Aluminum hydroxide colloid | 0/100 | — | — | — | — | 950 |
| 120* | — | " | 0/100 | Glycol cellulose | 1.0 | 50 | 20 | 800 |
| 121* | 1 | " | 100/50 | — | — | — | — | 50 |
| 122 | 1 | " | 100/50 | Glycol cellulose | 1.0 | 50 | 20 | 0 |
| 123 | 2 | " | 100/100 | Galactan | 0.5 | 80 | 15 | 0 |
| 124 | 2 | Ferrous hydroxide colloid | 100/150 | Alkali lignin | 0.5 | 80 | 15 | 0 |
| 125 | 3 | Molybdenum oxide colloid | 100/200 | Alcohol lignin | 0.5 | 80 | 15 | 0 |
| 126 | 3 | Manganese dioxide colloid | 100/50 | Mannan | 0.5 | 80 | 15 | 0 |
| 127 | 1 | Aluminum hydroxide colloid | 100/20 | Amylopectin | 1.0 | 50 | 30 | 0 |
| 128 | 1 | Stannic acid colloid | 100/50 | Methyl cellulose | 1.0 | 50 | 15 | 0 |
| 129 | 1 | Litium silicate colloid | 100/200 | Periodate lignin | 0.5 | 50 | 15 | 0 |
| 130 | 1 | Titanium sulfate | 100/5 | Dextrin | 1.5 | 60 | 20 | 0 |

EXAMPLE 2

Polymerization was conducted using a stainless steel polymerization vessel with a inner capacity of 100 liters and having a stirrer.

In each experiment, a coating solution (A) was first applied to the inner wall, etc. to form a first coating, and thereafter a coating solution (B) was applied thereto, in the same manner as in Example 1.

Table 2 shows (i) the aromatic condensate, (ii) the metal compound or inorganic colloid, the weight ratio of the component (i)/(ii) in the coating solution (A) in each experiment, as well as the anionic polymeric compound, amphoteric polymeric compound, or hydroxyl group-containing polymeric compound, and the conditions of the application and drying of the coating solution (B) in each experiment. However, Experiment Nos. 201 to 205 and 216 to 231 are comparative examples in which no coating solution was applied, or only any one of the coating solution (A) and coating solution (B) was applied.

Next, in the polymerization vessel thus coated, were charged 40 kg of water, 500 g of sodium oleate, 13 kg of a polybutadiene latex (solid content: 45%), 9.0 g of styrene, 5.0 g of acrylonitrile, 40 g of tertdodecylmercaptane and 140 g of cumene hydroperoxide. After the inner temperature was raised to 65° C., 200 g of grape sugar, 2 g of ferrous sulfate, and 100 g of sodium pyrophosphate were charged. Then, polymerization was carried out at 65° C. with stirring for 5 hours. After the completion of the polymerization, the amount of polymer scale depositing on the inner wall of the polymerization vessel was measured.

The results are given in Table 2.

ganic colloids, wherein said metal compounds are metal salts comprising anions in which the anions are selected from the group consisting of silicates, carbonates, phosphates, sulfates, nitrates, borates, acetates, hydroxides, oxides, and halides, and the coating thus formed has been coated with (B) a coating solution comprising at least one member selected from the group consisting of anionic polymeric compounds, amphoteric polymeric compounds and hydroxyl group-containing polymeric compounds.

2. The method according to claim 1, wherein said aromatic condensate is at least one member selected from the group consisting of:

(1) the condensate prepared by reacting an aromatic amine compound with an aromatic nitro compound in the presence of a condensation catalyst at 100° to 250° C., or the basic form thereof produced by treatment with an alkali metal salt or ammonium compound;

(2) the linear or branched polyaromatic amine with a molecular weight of about 250 or more represented by the following formula (IV):

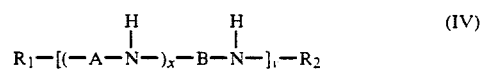

wherein $R_1$ represents a hydrogen atom, —OH, —NH$_2$, or the group:

TABLE 2

| | Coating solution (A) | | | Coating solution (B) | | | | |
|---|---|---|---|---|---|---|---|---|
| Exp. No. | (i) No. of Aromatic Condensate | (ii) Metal compound or inorganic colloid | (i)/(ii) weight ratio | Anionic or amphoteric polymer | Concentration (wt. %) | Coating temp. (°C.) | Time for drying | Amount of scale (g/m$^2$) |
| 201* | — | — | — | — | — | — | — | 600 |
| 202* | 1 | — | 100/0 | — | — | — | — | 400 |
| 203* | — | — | — | Gelatin | 0.5 | 50 | 20 | 510 |
| 204* | — | Litium silicate colloid | 0/100 | — | — | — | — | 450 |
| 205* | 1 | " | 100/100 | — | — | — | — | 300 |
| 206 | 1 | " | 100/100 | Gelatin | 0.5 | 50 | 20 | 0 |
| 207 | 2 | " | 100/150 | " | 0.5 | 70 | 15 | 0 |
| 208 | 3 | " | 100/150 | " | 0.5 | 70 | 15 | 0 |
| 209 | 1 | Silicic acid colloid | 100/30 | Carboxymethyl cellulose | 1.0 | 50 | 30 | 0 |
| 210 | 2 | " | 100/200 | Casein | 1.0 | 50 | 30 | 0 |
| 211 | 3 | " | 100/150 | Polyacrylic acid | 1.0 | 50 | 30 | 0 |
| 212 | 1 | Aluminum hydroxide colloid | 100/50 | Alginic acid | 0.5 | 80 | 10 | 0 |
| 213 | 1 | Sulfur colloid | 100/10 | Casein | 1.5 | 50 | 15 | 0 |
| 214 | 1 | Ferrous hydroxide colloid | 100/100 | Polystyrene sulfonic acid | 0.5 | 50 | 15 | 0 |
| 215 | 1 | " | 100/100 | Glue | 2.0 | 70 | 15 | 0 |
| 216* | — | — | — | — | — | — | — | 600 |
| 217* | 1 | — | 100/0 | — | — | — | — | 400 |
| 218* | — | — | — | Oxidized starch | 1.0 | 50 | 15 | 580 |
| 219* | — | Silicic acid colloid | 0/100 | — | — | — | — | 460 |
| 220* | 1 | " | 100/50 | — | — | — | — | 290 |
| 221 | 1 | " | 100/50 | Oxidized starch | 1.0 | 50 | 15 | 0 |
| 222 | 1 | Sodium silicate | 100/10 | Glycol cellulose | 1.5 | 80 | 15 | 1 |
| 223 | 1 | Nickel chloride | 100/50 | Methyl cellulose | 0.5 | 80 | 15 | 1 |
| 224 | 1 | Ferrous hydroxide colloid | 100/50 | Mannan | 2.0 | 50 | 30 | 0 |
| 225 | 1 | " | 100/100 | Dioxane lignin | 2.5 | 50 | 30 | 0 |
| 226 | 1 | Titanium sulfate | 100/5 | Alcohol lignin | 0.5 | 50 | 15 | 1 |
| 227 | 2 | " | 100/20 | Mannan | 0.5 | 50 | 15 | 1 |
| 228 | 3 | " | 100/50 | Dextrin | 0.5 | 50 | 15 | 1 |
| 229 | 1 | Aluminum hydroxide colloid | 100/20 | Amylopectin | 0.5 | 70 | 30 | 0 |
| 230 | 2 | " | 100/200 | " | 0.5 | 70 | 30 | 0 |
| 231 | 3 | " | 100/150 | Galactan | 0.5 | 70 | 30 | 0 |

We claim:

1. A method of preventing polymer scale deposition in a polymerization vessel during polymerization of a monomer having an ethylenically unsaturated double bond, wherein said polymerization is carried out in a polymerization vessel of which the inner wall has been previously first coated with (A) a coating solution comprising an aromatic condensate and at least one member selected from the group consisting of metal compounds and inor-

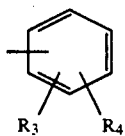

where $R_3$ and $R_4$ may be the same or different and each represent a hydrogen atom, —OH, —NH$_2$, a halogen atom, or an alkyl group having 1 to 8 carbon atoms, $R_2$ represents a hydrogen atom, —OH or the group:

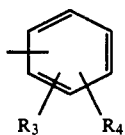

where $R_3$ and $R_4$ are the same as defined above, and A and B may be the same or different and each represent the group:

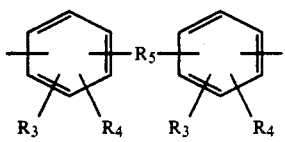

where $R_3$ and $R_4$ are the same as defined above, and and $R_5$ is

or a linear or branched alkylene group or alkylidene group having 1 to 5 carbon atoms, or the group:

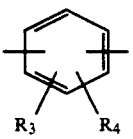

where $R_3$ and $R_4$ are the same as defined above, x is an integer of from 1 to 4, and y is an integer of from 1 to 15; and (3) the reaction product of pyrogallol with an aldehyde, containing a unit in its molecule represented by the general formula:

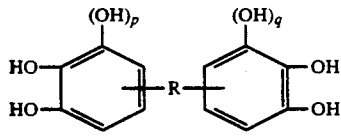

Wherein R represents a divalent hydrocarbon group having from 1 to 30 carbon atoms, and p and q are an integer of 0 or 1.

3. The method according to claim 2, wherein the condensate of said (1) is the one of aniline with nitrobenzene.

4. The method according to claim 2, wherein the aromatic polyamine of said (2) is the condensate of m-phenylenediamine with resorcinol.

5. The method according to claim 2, wherein the reaction product of said (3) is the one of pyrogallol with benzaldehyde.

6. The method according to claim 1, wherein said metal compound or inorganic colloid is selected from the group consisting of silicates of magnesium, calcium, aluminum and titanium; phosphates of magnesium, calcium, barium and titanium; sulfates of titanium, tin, iron and nickel; hydroxides of magnesium, calcium, aluminum and iron; and colloids of ferric hydroxide, aluminum hydroxide, stannic acid, silicic acid, aluminum hydroxide, and lithium silicate.

7. The method according to claim 1, wherein said coating solution (B) contains at least one compound selected from the group consisting of polyacrylic acid, sodium salts of carboxymethyl cellulose, gelatin, gallotannin, catechol, amylopectin, dextrin, methyl cellulose, glycol cellulose, mannan, galactan, alcohol lignin, dioxane lignin, alkali lignin, and acid lignin.

8. The method according to claim 1, the coating solution (A) has a weight ratio of the aromatic condensate/the metal compound or inorganic colloid in the range of from 100/0.1 to 100/500.

9. The method according to claim 1, wherein the first coating formed from the coating solution (A) has a coating weight of from 0.001 to 5 g/m$^2$, and the second coating formed from the coating solution (B) has a coating weight of from 0.001 to 5 g/m$^2$.

10. The method according to claim 1, wherein said coating operations of the coating solutions (A) and (B) have been previously conducted for parts of the polymerization vessel with which the monomer comes into contact during polymerization other than its inner wall surface.

11. The method according to claim 1, wherein said coating operations of the coating solutions (A) and (B) have been further previously conducted for parts of the recovery system of an unreacted monomer with which the monomer comes to contact during polymerization.

12. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

13. The method according to claim 1, wherein said polymerization is carried out as suspension polymerization, emulsion polymerization, solution polymerization or bulk polymerization.

14. A polymerization vessel of which the inner wall has been previously first coated with
a) A coating solution comprising a condensate of an aromatic compound and at least one member selected from the group consisting of metal compounds and inorganic colloids, wherein said metal compounds are metal salts comprising anions in which the anions are selected from the group consisting of silicates, carbonates, phosphates, sulfates, nitrates, borates, acetates, hydroxides, oxides, and halides, and the coating thus formed has been coated with
b) A coating solution comprising at least one member selected from the group consisting of anionic polymeric compounds, amphoteric polymeric compounds and hydroxyl group-containing polymeric compounds.

* * * * *